United States Patent
Anderson et al.

(10) Patent No.: US 9,465,239 B2
(45) Date of Patent: Oct. 11, 2016

(54) COLOR NEUTRAL THERMOCHROMIC LAYERS AND LAMINATES

(71) Applicants: Christopher D. Anderson, East Grand Rapids, MI (US); Michael D. Broekhuis, Wyoming, MI (US); Harlan J. Byker, West Olive, MI (US); Samuel J. DeJong, Hudsonville, MI (US)

(72) Inventors: Christopher D. Anderson, East Grand Rapids, MI (US); Michael D. Broekhuis, Wyoming, MI (US); Harlan J. Byker, West Olive, MI (US); Samuel J. DeJong, Hudsonville, MI (US)

(73) Assignee: PLEOTINT, L.L.C., West Olive, MI (US)

(*) Notice: Subject to any disclaimer, the term of this patent is extended or adjusted under 35 U.S.C. 154(b) by 154 days.

(21) Appl. No.: 14/264,254

(22) Filed: Apr. 29, 2014

(65) Prior Publication Data

US 2014/0327952 A1    Nov. 6, 2014

Related U.S. Application Data

(60) Provisional application No. 61/819,935, filed on May 6, 2013.

(51) Int. Cl.
| | | |
|---|---|---|
| *G02F 1/01* | (2006.01) | |
| *G02F 1/00* | (2006.01) | |
| *E06B 9/24* | (2006.01) | |
| *B32B 17/10* | (2006.01) | |

(52) U.S. Cl.
CPC ....... *G02F 1/0147* (2013.01); *B32B 17/10036* (2013.01); *B32B 17/10477* (2013.01); *B32B 17/10651* (2013.01); *B32B 17/10761* (2013.01); *E06B 9/24* (2013.01); *G02F 1/009* (2013.01)

(58) Field of Classification Search
CPC ............ B32B 17/10; B32B 17/10036; B32B 17/10651; G02F 1/009; G02F 1/0147; E06B 9/24
USPC ................ 359/288, 321, 359, 885; 345/106; 252/583; 52/173.3, 786.1
See application file for complete search history.

(56) References Cited

U.S. PATENT DOCUMENTS

| | | | |
|---|---|---|---|
| 6,084,702 A | 7/2000 | Byker et al. | |
| 6,446,402 B1 | 9/2002 | Byker et al. | |
| 7,525,717 B2 | 4/2009 | Byker et al. | |
| 7,538,931 B2 | 5/2009 | Byker et al. | |
| 7,542,196 B2 | 6/2009 | Byker et al. | |
| 7,817,328 B2 | 10/2010 | Millett et al. | |
| 8,018,639 B2 | 9/2011 | Byker et al. | |
| 8,154,788 B2 | 4/2012 | Millett et al. | |
| 8,182,718 B2 | 5/2012 | Byker et al. | |
| 8,431,045 B2 | 4/2013 | Byker et al. | |
| 8,623,243 B2 | 1/2014 | Anderson et al. | |
| 2013/0229702 A1 | 9/2013 | Broekhuis et al. | |

*Primary Examiner* — Tuyen Tra
(74) *Attorney, Agent, or Firm* — Thompson Hine LLP

(57) ABSTRACT

A combination of layers comprised of:
1) a first LETC layer;
2) a second LETC layer and
3) a separator layer between the two LETC layers
4) an additive within at least one of the LETC layers and the separator layer wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

11 Claims, 2 Drawing Sheets

COLOR NEUTRAL THERMOCHROMIC LAYERS AND LAMINATES

BACKGROUND

There is a desire for variable transmission windows to tint with a neutral color. This often requires more than one chromogenic layer to achieve the required spectral coverage. This is often the case with sunlight responsive thermochromic, (TC), layers for windows and the use of multiple TC layers to achieve neutral appearance of transmitted light is described in detail in U.S. Pat. No. 7,525,717. This patent discloses TC layers that have neutral appearance over a large temperature range when the films are warm and tinted. However, whether there is one or more than one TC layer, it has still been difficult to achieve a neutral color for lightly tinted layers or laminates at or below room temperature. For the purpose of this invention, "at or below room temperature" is defined as temperatures between about 35° C. and about 0° C.

For the purpose of this invention, a neutral color or appearance is defined as film or laminate with CIELAB 1971 color coordinates with values of about $-8.5 \leq a^* \leq$ about 8.5 and about $-8.5 \leq b^* \leq$ about 8.5. For the definition of the CIELAB color coordinate $a^*$, $b^*$, $L^*$ and Y values see *Color Science: Concepts and Methods, Quantitative Data and Formulae*, $2^{nd}$ Ed. J. Wiley & Sons: New York, 1982

The present invention describes methods for color suppression of the TC layer(s) or laminate(s) made with TC layer(s). Color suppression means that the color of the TC layer(s) or laminate(s) utilizing one or more of the methods of this disclosure are more neutral in color appearance than layer(s) or laminate(s) would be without one or more than one of the methods. Remarkably, color suppression methods have been discovered that can be incorporated into the TC layer(s) or laminate(s) without adversely affecting the performance or durability of the layer(s) in their intended application. Simultaneously achieving color suppression, high performance and excellent durability with TC films for use in dynamic windows is no trivial matter.

A TC layer or a combination of TC layers that are based on transition metal complexes in Ligand Exchange Thermochromic, (LETC), systems generally have some residual color (i.e., the transmitted light is not neutral) due to small visible light absorbance of the TC materials when the layers, films or laminates are at or below room temperature. These TC layers typically go from lightly green tinted at 25° C. to a near neutral gray tint by 40° C. and continue to appear neutral at increasing temperatures up to 85° C. or up to temperatures which can be reached by exposure to direct sunlight. Below 25° C. and down to 0° C. and below there is relatively little decrease in absorbance or tint for TC layers that are designed for use in sunlight responsive windows for buildings. The present inventions address making this slight non-neutral tint appear neutral in color throughout the 0° C. to 35° C. range so that overall these inventions disclose TC layers and laminates that are neutral in color for the entire useful range of from about 0° C. to about 85° C.

One way to compensate for the residual color of TC films, and thereby cause the color of the transmitted light to be more neutral, is to use a spectrally selective glass pane (or panes) to adjust the perceived color; however there is a limited selection of spectrally selective glass options and such an approach would impose significant restrictions on architects and building owners wishing to use TC films.

Another method, we have discovered, for solving this problem involves the modification of the composition of the TC layers such that a desirable color can be obtained. We have found that it is possible to achieve a desirable color through the use of one or more additives in one or more of the TC films. The additive(s) absorb a portion of visible light spectrum to impart a neutral color to the TC films and the laminates made with the TC films between sheets of glass. However the additives must not degrade performance or durability of the TC system and must be durable in and of themselves.

We have discovered that certain carefully selected additives may be added to one or more TC layers or associated layers to give a neutral appearance at room temperature. Preferred additives are dyes with an absorbance maximum in the about 500 nanometer to about 560 nanometer range. The concentration of the dyes in the layer is such that the additional absorbance due to the dye somewhere in the wavelength range of about 500 nanometers to about 560 nanometers is between about 0.05 to about 0.4 absorbance units. The concentration required to provide this additional absorbance will depend on the thickness of the layer which comprises the dye and the absorption coefficient of the dye in the layer. The concentration required may be determined from these values. These dyes may be organic dyes or they may be coordination compound dyes. Thus in addition to organic dyes, we have discovered that certain ligands can be added to one or more of the TC layers and form a coordination compound dye with metal ions already present to give a neutral appearance at room temperature. Remarkably these ligands and the resulting coordination compound dyes do not adversely impact the color appearance of the TC system at elevated temperatures or the durability of the TC layers during prolonged sunlight exposure.

We have also found that one may add one or more than one spectrally selective, lamination layer or interlayer to a TC layer or combination of TC layers or interlayers and have demonstrated that this approach can compensate for the color of TC layers at or below room temperature. This approach to color suppression has the added advantage that the additional lamination layer(s) provide added shatter resistance, a thermal barrier between the TC layer(s) and wind or air current on outside of the laminate and an opportunity to provide a UV barrier for the TC layer(s). A lamination layer typically provides safety characteristics to a laminate. Typical lamination layers or interlayers are polymer or plastic films or sheets that provide impact resistance and have good elongation and thus are difficult to tear and typically they adhere well to glass. Typical lamination layers or interlayers are layers of poly(vinyl butyral) or PVB, ethylene vinyl acetate or EVA, thermoplastic polyurethanes or TPU and polyethylene-co-methacrylic acid partially neutralized with metal ions like lithium, sodium or zinc, also known as ionomer layers.

Yet another approach to color suppression is to provide color compensation character in the separator layers if there is more than one TC layer in the system or a TC layer or layers and an additional lamination layer. Separator layers are used to prevent the intermixing of TC materials from one layer into another and the diffusion of TC materials from a TC layer into a non-TC lamination layer. Separator layers are typically polymer or plastic layers that are impermeable to TC materials. Typical separator layers are polyethylene terephthalate or PET, polyethylene naphthalate or PEN, polymethylmethacrylate or PMMA and polyolefins such as polypropylene or PP and polyethylene or PE. Separators may also be multiple layers of alternating refractive index such as are disclosed in U.S. Publication 2013/0229702.

The organic dyes and the coordination compound dyes disclosed herein may be located in the one or more than one TC layer, they may be located in one or more than one lamination layer, they may be located in one or more than one separator layer or any combination thereof. Also any separator layer, lamination layer, glass layer or combination that provides the desired absorbance to provide a neutral appearance to laminates made with one or more than one TC layer are included in this the present invention.

Preferably a spectrally selective lamination layer, a spectrally selective separator layer or a spectrally selective sheet of glass will have an absorbance maximum in the range of about 500 nanometers to about 560 nanometers. This absorbance at the maxima between about 500 nanometers and 560 nanometers will preferably increase the absorbance of the laminate by between about 0.05 and about 0.4 absorbance units at the absorbance maxima between about 500 nanometers and 560 nanometers. The spectrally selective layers and the dyes may have additional absorbance maxima that are outside of the range of about 500 nanometers to about 560 nanometers.

A preferred type of TC materials for use in the TC layers of the present invention are termed ligand exchange thermochromic, LETC, materials. LETC materials have TC activity which results in a reversible change in absorbance of electromagnetic radiation as the temperature of the system is reversibly changed. That the change is reversible means that the amount the absorbance increases as the temperature increases is the same as the amount the absorbance decreases as the temperature decreases for a cycle of temperature increase and decrease over a given temperature range. LETC materials of interest for use in practical TC systems, layers and devices are stable on repeated temperature cycling for some useful number of cycles. Preferred LETC materials and systems have a net increase in their ability to absorb UV, visible and/or NIR light energy as the temperature of the system increases and a net decrease in their ability to absorb UV, visible and/or NIR light energy as the temperature of the system decreases for temperatures within the active range of the system. The active temperature range of the system is determined by the thermodynamic properties of the LETC reactions. For many preferred applications, like sunlight responsive TC windows, the active temperature range of the TC systems includes −20° C. to 100° C. and more preferably 0° C. to 80° C.

It is preferred that the electromagnetic radiation, for which absorbance changes occur, be in the ultraviolet and/or especially the visible and/or NIR portions of the electromagnetic spectrum. The change in light absorption on heating of the LETC systems generally results in a change from one color to another color and/or a darkening of the color of the system. If the increase in light absorption is predominantly in the NIR, the LETC system may still be very useful even though little or no visual color change occurs. However, for most preferred applications of the LETC systems or layers disclosed herein, there is a net increase in the ability of the system to absorb incident visible and/or NIR sunlight power (or energy over time), as the temperature of the system increases from $T_1$ to $T_2$ and an equal net decrease in the ability of the system to absorb incident visible and/or NIR sunlight power (or energy over time), as the temperature of the system decreases from $T_2$ to $T_1$. In most cases, this means that the LETC systems become darker in color as the temperature of the system increases and lighter in color as the temperature of the system decreases. In general there is no change in the amount of light scattered or reflected by the LETC system itself.

U.S. Pat. Nos. 6,084,702; 6,446,402; 7,525,717; 7,538,931; 7,542,196; 7,817,328; 8,018,639; 8,154,788; 8,182,718; 8,431,045 and 8,623,243 describing TC devices, TC window structures, LETC materials, systems, layers and devices are hereby incorporated into this disclosure by reference. LETC systems comprise one or more than one transition metal ion such as Fe(II), Co(II), Ni(II) or Cu(II) ions, which experience thermally induced changes in the nature of the complexation or coordination around the transition metal ion(s) and thereby the system changes its ability to absorb electromagnetic radiation as the temperature changes. As explained in U.S. Pat. Nos. 7,525,717; 7,538,931; 7,542,196; 8,018,639; 8,182,718 and 8,431,045, LETC systems employ so-called high epsilon ligands (HϵL's) and low epsilon ligands (LϵL's). Upon increasing the temperature of the TC system, layer or device, one or more of the LϵL's will be displaced by one or more HϵL's to give a complex that absorbs more visible and/or NIR radiation. Examples of LϵL's are diols, triols and certain hydroxyl containing polymers like poly(vinyl butyral). Examples of HϵL's are chloride, bromide, iodide and molecules that coordinate to transition metal ions through one or more than one nitrogen, oxygen, phosphorus or sulfur atom in the molecules.

For the use of LETC systems in applications like variable transmission, energy saving windows, especially windows containing Suntuitive™ TC film(s), there is a demand for certain colors. While fixed tint windows which are gray, green, blue and bronze are in widespread use, the most desirable color, (or lack thereof), for variable tint windows is gray. This is especially true when the window is or is able to become heavily tinted as the view through a heavily tinted gray window maintains the same color rendition for objects viewed through the window as is maintained with a lightly tinted or nearly colorless window. Also it is highly desirable for the daylighting that comes in through the window to be gray or color neutral so that people and objects illuminated by the incoming light are perceived as having a normal appearance.

The inventions disclosed here-in are particularly useful when used in combination with the window structures or constructions disclosed in U.S. Pat. Nos. 6,084,702; 6,446,402; 7,817,328 and 8,154,788. The contents of these patents are hereby incorporated into this disclosure by reference.

Preferably the small amount of color neutralizing absorbance is provided by a coordination compound dye such those formed between nickel(II) ions and a bidentate ligand selected from neocuproine (CAS #484-11-7), 6,6'-dimethyl-2,2'-dipyridyl (CAS #4411-80-7), 6-methyl-2,2'-dipyridylamine (CAS #342653-84-3), 6,6'-dimethyl-2,2'-dipyridylamine (CAS #85895-80-3), 6-butyl-6'-methyl-2,2'-dipyridyl (the preparation of which is disclosed in U.S. Pat. No. 7,538,931) and combinations thereof. This coordination compound dye may also involve bromide ions coordinated to the same nickel(II) ion as the nitrogen containing ligands. These coordination compound dyes are assumed to be formed by one bidentate ligand and two bromide ions in a near tetrahedral or near square planar configuration. The ligands listed above generally coordinate strongly to nickel (II) and thus generally do not participate to a large extent in the TC reactions that take place in the TC systems described in the examples disclosed herein. Coordination compound dyes that are nickel(II) complexes with these ligands have been discovered to provide absorbance in the 500 nanometer to 560 nanometer range. These complexes do not interfere with the performance of the TC layers and the laminates containing TC layers with these complexes are still durable when tested in accelerated sunlight aging tests because of an apparent lack of chemical and photochemical reactivity with any of the materials in the TC systems and an inherent chemical and photochemical stability of the dye in the TC system or laminates made with the TC interlayer.

Preferable organic dyes that provide absorbance in the about 500 nanometer to about 560 nanometer range are Keyplast Red 2G (from Keystone Aniline Corp., this dye is also known as C.I. Solvent Red 1 and 1-[2-(2-methoxyphenyl)diazenyl]-2-naphthalenol (CAS #1229-55-6)), Quinaldine Red (this dye is also known as 2-[2-[4-(dimethylamino)phenyl]ethenyl]-1-ethyl-quinolinium iodide (CAS #117-92-0)), Safranin O (this dye is also known as 3,7-diamino-2,8-dimethyl-5-phenyl-phenazinium chloride (CAS #477-73-6)), Astrazon Orange G (this dye is also known as 2,3-dihydro-1,3,3-trimethyl-2-[2-(2-methyl-3H-indol-3-ylidene)ethylidene]-1H-indole hydrochloride (CAS #3056-93-7)), Keyplast Red A (from Keystone Aniline Corp., this dye is also known as C. I. Solvent Red 24 and 1-[2-[2-methyl-4-[2-(2-methylphenyl)diazenyl]phenyl]diazenyl]-2-naphthalenol (CAS #85-83-6)) and Keyplast Scarlet BLZ (from Keystone Aniline Corp., this dye is also known as C.I. Solvent Orange 7 and 1-[2-(2,4-dimethylphenyl)diazenyl]-2-naphthalenol (CAS #3118-97-6)). These dyes do not interfere with the performance of the TC layers and the TC layers containing these dyes are still durable when the laminates made with films containing these dyes are tested in accelerated sunlight aging tests because of an apparent lack of chemical and photochemical reactivity with the TC system and an inherent chemical and photochemical stability of these dyes in the TC system and the laminates made with the TC system.

The assembly of a laminate incorporating a spectrally selective glass pane is described in Example 24. The calculated color coordinates based on spectral data recorded at several temperatures from 20° C. and 85° C. are provided in Table 3. The use of a 6 millimeter pane of Optiblue glass (from PPG, Inc.) provided a laminate with a neutral appearance, with about $-8.5 \leq a^* \leq$ about 8.5 and about $-8.5 \leq a^* \leq$ about 8.5, both at room temperature and at each recorded temperature. We have discovered this as one of few readily available spectrally selective window glass options that effectively compensate for the residual color of LETC layers.

The invention is a spectrally selective sheet of glass, a LETC layer and sheet of clear glass which forms a laminate with color coordinate values of about $-8.5 \leq a^* \leq$ about 8.5 and about $-8.5 \leq b^* \leq$ about 8.5 throughout the temperature range of about 0° C. to about 85° C.

The invention is a combination of layers comprised of a first LETC layer, a second LETC layer and a separator layer between the two LETC layers with a dye in one or more of the LETC layers and the separator layer wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a combination of layers comprised of a spectrally selective lamination layer, a separator layer between the spectrally selective lamination layer and the first LETC layer, a first LETC layer, a second LETC layer and a separator layer between the two LETC layers wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a combination of layers comprised of a spectrally selective separator layer between a first LETC layer and a second LETC layer wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a LETC layer which comprises an additive selected from Keyplast Red 2G, Quinaldine Red, Safranin O, Astrazon Orange G, Keyplast Red A, Keyplast Scarlet BLZ and combinations thereof wherein when the layer is part of a laminate between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a LETC layer and a lamination layer wherein the lamination layer comprises an additive selected from Keyplast Red 2G, Quinaldine Red, Safranin O, Astrazon Orange G, Keyplast Red A, Keyplast Scarlet BLZ and combinations thereof and wherein when the layer is part of a laminate between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a combination of layers comprised of a spectrally selective separator layer between a first LETC layer and a second LETC layer wherein the separator layer comprises an additive selected from Keyplast Red 2G, Quinaldine Red, Safranin O, Astrazon Orange G, Keyplast Red A, Keyplast Scarlet BLZ and combinations thereof and wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a LETC layer which comprises an additive selected from neocuproine, 6,6'-dimethyl-2,2'-dipyridyl, 6-methyl-2,2'-dipyridylamine, 6,6'-dimethyl-2,2'-dipyridylamine, 6-butyl-6'-methyl-2,2'-dipyridyl and combinations thereof wherein when the layer is part of a laminate between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a LETC layer and a lamination layer wherein the lamination layer comprises an additive selected from neocuproine, 6,6'-dimethyl-2,2'-dipyridyl, 6-methyl-2,2'-dipyridylamine, 6,6'-dimethyl-2,2'-dipyridylamine, 6-butyl-6'-methyl-2,2'-dipyridyl and combinations thereof and wherein when the layer is part of a laminate between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a combination of layers comprised of a spectrally selective separator layer between a first LETC layer and a second LETC layer wherein the separator layer comprises an additive selected from neocuproine, 6,6'-dimethyl-2,2'-dipyridyl, 6-methyl-2,2'-dipyridylamine, 6,6'-dimethyl-2,2'-dipyridylamine, 6-butyl-6'-methyl-2,2'-dipyridyl and combinations thereof and wherein when the layers are laminated between two sheets of clear glass the color coordinate values of the laminate are about $-8.5 \leq a^* \leq$ about 8.5 and about $-8.5 \leq b^* \leq$ about 8.5 throughout the temperature range of about 0° C. to about 85° C.

The invention is a LETC layer, a lamination layer, a separator layer or a combination thereof which comprises an additive or dye with an absorbance maxima in the about 500 nanometer to about 560 nanometer range present in an amount which provides an additional absorbance due to the additive or dye somewhere in the wavelength range of about 500 nanometers to about 560 nanometers of about 0.05 to about 0.4 absorbance units. The invention is further illustrated by the following examples, tables and drawings.

DETAILED DESCRIPTION

Figure 1:
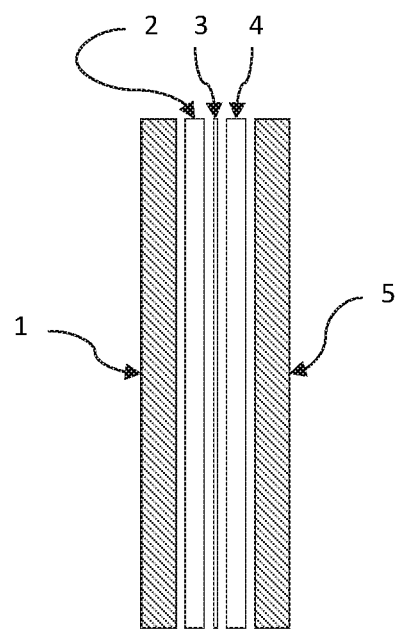
FIG. 1 shows a typical TC laminate construction with two panes of structural material (such as, glass, plastics or ceramics) numbered 1 and 5, TC polymer films numbered 2 and 4 are separated by a separator layer numbered 3. The separator layer 3 can be transparent or colored. The layers are laminated together using standard techniques.
Figure 2:
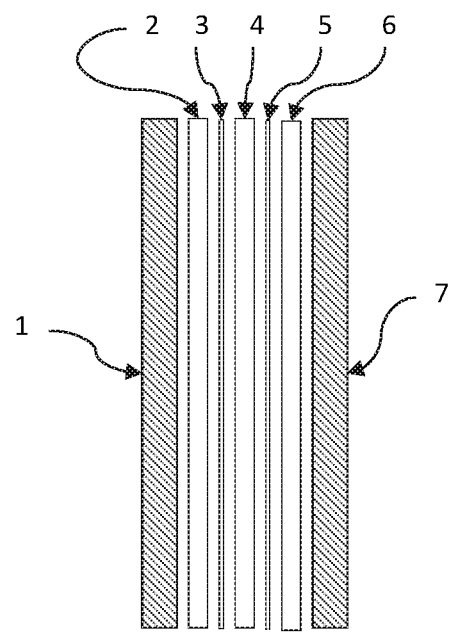
FIG. 2 shows a TC laminate construction used in cases when spectrally selective lamination films are added to provide color suppression. In this case, the drawing includes two panes of structural material (such as, glass, plastics or ceramics) numbered 1 and 7, two separator layers 3 and 5 and three additional films numbered 2, 4 and 6. Two of the films numbered 2, 4 and 6 are TC and one is spectrally selective to provide color suppression. In this drawing, the structural material numbered 1 is the exterior surface of the laminate which is closest the source of solar radiation. The preferred ordering of the films 2, 4 and 6 is to have the spectrally selective film be in position number 2 and TC polymer films are in positions 4 and 6. This preferred ordering provides additional shielding of the TC films from certain wavelengths of solar radiation; however, other orderings of films 2, 4 and 6 are also possible.

In the following examples the extruded film was dried to remove most of the water before being laminated between sheets of glass.

Reference Example 1

An extruded film about 765 micrometers thick comprising, in parts by weight, 3.1 parts nickel bromide hydrate, 3.7 parts 1-pentylbenzimidazole, 11.9 parts tetrabutylammonium bromide, 0.5 parts water, 9.9 parts 2-butyl-2-ethyl-1,3-propanediol, 1.4 parts stabilizers, 7.9 parts triethyleneglycol bis-(2-ethyl hexanoate) and 61.6 parts polyvinylbutyral was prepared. A portion of this film was laminated between two pieces of 3 mm clear float glass and portions of this film were used in Examples 15, 21, 22, 23 and 24.

Example 2

An extruded film about 765 micrometers thick comprising, in parts by weight, 3.1 parts nickel bromide hydrate, 3.7 parts 1-pentylbenzimidazole, 0.1 parts neocuproine, 12.0 parts tetrabutylammonium bromide, 0.4 parts water, 9.9 parts 2-butyl-2-ethyl-1,3-propanediol, 1.4 parts stabilizers, 7.7 parts triethyleneglycol bis-(2-ethyl hexanoate) and 61.7 parts polyvinylbutyral was prepared. A portion of this film was laminated between two pieces of 3 mm clear float glass and a portion of this film was also used in Example 16.

Example 3

An extruded film about 765 micrometers thick comprising, in parts by weight, 3.2 parts nickel bromide hydrate, 3.8 parts 1-pentylbenzimidazole, 0.001 parts Keyplast Red 2G, 11.9 parts tetrabutylammonium bromide, 0.4 parts water, 9.9 parts 2-butyl-2-ethyl-1,3-propanediol, 1.4 parts stabilizers, 7.7 parts triethyleneglycol bis-(2-ethyl hexanoate) and 61.7 parts polyvinylbutyral was prepared. A portion of this film was laminated between two pieces of 3 mm clear float glass and a portion of this film was used in Example 17.

Example 4

An extruded film about 765 micrometers thick comprising, in parts by weight, 3.2 parts nickel bromide hydrate, 3.8 parts 1-pentylbenzimidazole, 0.001 parts Quinaldine Red, 11.9 parts tetrabutylammonium bromide, 0.4 parts water, 9.9 parts 2-butyl-2-ethyl-1,3-propanediol, 1.4 parts stabilizers, 7.7 parts triethyleneglycol bis-(2-ethyl hexanoate) and 61.7 parts polyvinylbutyral was laminated between two pieces of 3 mm clear float glass.

Example 5

An extruded film about 765 micrometers thick comprising, in parts by weight, 3.1 parts nickel bromide hydrate, 3.7 parts 1-pentylbenzimidazole, 0.2 parts 6,6'-dimethyl-2,2'-dipyridyl, 11.9 parts tetrabutylammonium bromide, 0.5 parts water, 9.9 parts 2-butyl-2-ethyl-1,3-propanediol, 1.4 parts stabilizers, 7.7 parts triethyleneglycol bis-(2-ethyl hexanoate) and 61.6 parts polyvinylbutyral was prepared. A portion of this film was laminated between two pieces of 3 mm clear float glass and a portion of this film was used in Example 20.

Example 6

A solvent cast film about 330 micrometers thick comprising, in parts by weight, 11.2 parts bis(tetrabutylammonium) tetrabromonickelate, 3.9 parts 1-pentyl benzimidazole, 0.2 parts 6-methyl-2,2'-dipyridylamine, 8.3 parts tetrabutylammonium bromide, 10.4 parts 2-butyl-2-ethyl-1,3-propanediol, 1.0 parts stabilizers and 65.0 parts polyvinylbutyral was laminated between two pieces of 3 mm clear float glass.

Example 7

A solvent cast film about 560 micrometers thick comprising, in parts by weight, 11.2 parts bis(tetrabutylammonium) tetrabromonickelate, 3.9 parts 1-pentyl benzimidazole, 0.002 parts Safranin O, 8.4 parts tetrabutylammonium bromide, 10.4 parts 2-butyl-2-ethyl-1,3-propanediol, 1.0 parts stabilizers and 65.1 parts polyvinylbutyral was laminated between two pieces of 3 mm clear float glass.

Example 8

A solvent cast film about 860 micrometers nominal thickness) comprising, in parts by weight, 3.2 parts nickel bromide hydrate, 3.8 parts 1-pentylbenzimidazole, 0.002 parts Astrazon Orange G, 12.1 parts tetrabutylammonium bromide, 0.4 parts water, 9.9 parts 2-butyl-2-ethyl-1,3-propanediol, 0.5 parts stabilizers, 7.8 parts triethyleneglycol bis-(2-ethyl hexanoate) and 62.3 parts polyvinylbutyral was laminated between two pieces of 3 mm clear float glass.

Example 9

A solvent cast film about 470 micrometers thick comprising, in parts by weight, 11.2 parts bis(tetrabutylammonium) tetrabromonickelate, 3.9 parts 1-pentyl benzimidazole, 0.001 parts Keyplast Red A, 8.4 parts tetrabutylammonium bromide, 10.4 parts 2-butyl-2-ethyl-1,3-propanediol, 1.0 parts stabilizers and 65.1 parts polyvinylbutyral was laminated between two pieces of 3 mm clear float glass.

Example 10

A solvent cast film about 530 micrometers thick comprising, in parts by weight, 11.2 parts bis(tetrabutylammonium) tetrabromonickelate, 3.9 parts 1-pentyl benzimidazole, 0.2 parts 6,6'-dimethyl-2,2'-dipyridylamine, 8.4 parts tetrabutylammonium bromide, 10.4 parts 2-butyl-2-ethyl-1,3-propanediol, 1.0 parts stabilizers and 64.9 parts polyvinylbutyral was laminated between two pieces of 3 mm clear float glass.

Example 11

A solvent cast film about 380 micrometers thick comprising, in parts by weight, 11.2 parts bis(tetrabutylammonium) tetrabromonickelate, 3.9 parts 1-pentyl benzimidazole, 0.2 parts 6-methyl-2,2'-dipyridylamine, 8.4 parts tetrabutylammonium bromide, 10.4 parts 2-butyl-2-ethyl-1,3-propanediol, 1.0 parts stabilizers and 64.9 parts polyvinylbutyral was laminated between two pieces of 3 mm clear float glass.

Example 12

A solvent cast film about 570 micrometers thick comprising, in parts by weight, 3.1 parts nickel bromide hydrate, 3.7 parts 1-pentylbenzimidazole, 0.2 parts 6-butyl-6'-methyl-2,2'-dipyridyl, 12.0 parts tetrabutylammonium bromide, 0.5 parts water, 10.0 parts 2-butyl-2-ethyl-1,3-propanediol, 0.5 parts stabilizers, 7.8 parts triethyleneglycol bis-(2-ethyl hexanoate) and 62.2 parts polyvinylbutyral was laminated between two pieces of 3 mm clear float glass.

Example 13

A solvent cast film about 670 micrometers thick comprising, in parts by weight, 3.2 parts nickel bromide hydrate, 3.8 parts 1-pentylbenzimidazole, 0.002 parts Keyplast Scarlet BLZ, 12.0 parts tetrabutylammonium bromide, 0.5 parts water, 10.0 parts 2-butyl-2-ethyl-1,3-propanediol, 0.5 parts stabilizers, 7.8 parts triethyleneglycol bis-(2-ethyl hexanoate) and 62.2 parts polyvinylbutyral was laminated between two pieces of 3 mm clear float glass.

Reference Example 14

An extruded film about 350 micrometers thick comprising, in parts by weight, 2.1 parts nickel iodide, 0.9 parts 4-(3-phenylpropyl)pyridine, 12.4 parts tetrabutylammonium iodide, 0.5 parts water, 3.2 parts 2-butyl-2-ethyl-1,3-propanediol, 2.8 parts stabilizers, 10.9 parts triethyleneglycol bis-(2-ethyl hexanoate) and 67.2 parts polyvinylbutyral was prepared. A portion of this film was laminated between two pieces of 3 mm clear float glass and portions of this film were used in Examples 15, 16, 17, 20, 21, 22, 23 and 24.

Example 15

A laminate was prepared with the following layers: (1) 3 mm clear float glass, (2) the extruded film of Example 1, (3) PET film about 50 micrometers thick, (4) the extruded film of Example 14 and (5) 3 mm clear float glass. This conventional or reference TC laminate has a slight green appearance that is objectionable to some observers. To make this laminate appear more neutral a small amount of absorbance in the about 500 nanometer to about 560 nanometer range has been discovered to be helpful.

Example 16

A laminate was prepared with the following layers: (1) 3 mm clear float glass, (2) the extruded film of Example 2, (3) PET film about 50 micrometers thick, (4) the extruded film of Example 14 and (5) 3 mm clear float glass.

Example 17

A laminate was prepared with the following layers: (1) 3 mm clear float glass, (2) the extruded film of Example 3, (3) PET film about 50 micrometers thick, (4) the extruded film of Example 14 and (5) 3 mm clear float glass.

Reference Example 18

An extruded film about 1130 micrometers thick comprising, in parts by weight, 1.1 parts nickel iodide, 0.5 parts 4-(3-phenylpropyl)pyridine, 12.4 parts tetrabutylammonium iodide, 0.3 parts water, 7.0 parts 2-butyl-2-ethyl-1,3-propanediol, 2.8 parts stabilizers, 8.9 parts triethyleneglycol bis-(2-ethyl hexanoate) and 67.0 parts polyvinylbutyral was laminated prepared. A portion of this film was laminated between two pieces of 3 mm clear float glass and a portion of this film was used in Example 19.

Example 19

A laminate comprising the following layers was prepared: (1) 3 mm clear float glass, (2) the extruded film of Example 4, (3) PET film about 50 micrometers thick, (4) the extruded film of Example 18 and (5) 3 mm clear float glass.

Example 20

A laminate comprising the following layers was prepared: (1) 3 mm clear float glass, (2) the extruded film of Example 5, (3) PET film about 50 micrometers thick, (4) the extruded film of Example 14 and (5) 3 mm clear float glass.

Example 21

A laminate comprising the following layers was prepared: (1) 3 mm clear float glass, (2) the extruded film of Example 1, (3) Eurofilter 279 Eighth Minus Green (from Trendco Gesellschaft für Professionelle Veranstaltungstechnik GmbH, Siegen, Germany), (4) the extruded film of Example 14 and (5) 3 mm clear float glass.

Example 22

A laminate comprising the following layers was prepared: (1) 3 mm clear float glass, (2) 0.060 in Vanceva #0123 (from Solutia, Inc.), (3) PET film about 50 micrometers thick, (4) the extruded film of Example 14, (5) PET film about 50 micrometers thick, (6) the extruded film of Example 1 and (7) 3 mm clear float glass.

Example 23

A laminate comprising the following layers was prepared: (1) 3 mm clear float glass, (2) 0.030 in Saflex Light Blue Green #377300 (from Solutia, Inc.), (3) 0.015 in Vanceva Color System by Saflex Coral Rose #807800 (from Solutia, Inc.), (4) PET film about 50 micrometers thick, (5) the extruded film of Example 14, (6) PET film about 50 micrometers thick, (7) the extruded film of Example 1 and (8) 3 mm clear float glass.

Example 24

A laminate comprising the following layers was prepared: (1) 6 mm Optiblue Glass (from PPG, Inc.), (2) the extruded film of Example 1, (3) PET film about 50 micrometers thick, (4) the extruded film of Example 14 and (5) 5 mm clear float glass.

From the measured spectra at about 25° C. the color coordinates were calculated for the laminates made with the films for the listed examples.

TABLE 1

Calculated Color Coordinates for Examples 1-23

| Example | a* | b* | L* | Y |
|---|---|---|---|---|
| 1 | -8.9 | -3.6 | 90.3 | 77 |
| 2 | -1.3 | -3.2 | 87.9 | 71.8 |
| 3 | -2.9 | -2.8 | 87.2 | 70.4 |
| 4 | 1.4 | -10 | 83.9 | 63.8 |
| 5 | 0.9 | -1.8 | 84.4 | 64.8 |
| 6 | -0.7 | -0.6 | 88.6 | 73.4 |
| 7 | 7 | -7.1 | 88 | 72 |
| 8 | -1.4 | 2.8 | 88.7 | 73.5 |
| 9 | -1.1 | -2.1 | 92.2 | 81.1 |
| 10 | 1.5 | -5.7 | 86.2 | 68.3 |
| 11 | 0.4 | -4.2 | 84.3 | 64.7 |
| 12 | 2.2 | -2.5 | 90.5 | 77.4 |
| 13 | -0.5 | 3.5 | 89 | 74.1 |
| 14 | -2.7 | 10.5 | 92.5 | 81.9 |
| 15 | -9.1 | 4.6 | 87.8 | 71.6 |
| 16 | -1.2 | 2.6 | 83.1 | 62.3 |
| 17 | -3.1 | 3.5 | 83.7 | 63.4 |
| 18 | -7 | 15.1 | 92.6 | 82.1 |
| 19 | -0.4 | -2.6 | 81 | 58.4 |
| 20 | 1 | 3.8 | 81.3 | 59 |
| 21 | 1 | 1.1 | 83.5 | 63.2 |
| 22 | -5.5 | 2.2 | 74.4 | 47.3 |
| 23 | -3.2 | 1.7 | 76.7 | 51.1 |

TABLE 2

Color Coordinates Calculated from Measured Visible Spectra for Select Examples. Spectra were measured before and after Weatherometer (WOM) exposure with a xenon arc lamp intensity of 0.55 W/m² @ 340 nm and black panel temperature of 85° C.
For laminates from examples 2, 3 and 5, a UV barrier was placed between the laminate and the light source in the WOM. For laminates from examples 16, 17 and 20, the side of the laminate with the film from example 14 was oriented toward the light source.

| Laminate from Example | WOM Hours | Laminate Temperature at Spectra Acquisition | a* | b* | L* | Y | c* |
|---|---|---|---|---|---|---|---|
| 2 | initial | 25° C. | -2.2 | -4.4 | 86.8 | 69.7 | 4.9 |
|  | 4,145 | 25° C. | -2.3 | -3.5 | 86.2 | 68.5 | 4.2 |
| 3 | initial | 25° C. | -2.9 | -2.8 | 87.2 | 70.4 | 4 |
|  | 4,051 | 25° C. | -3 | -1.2 | 87.1 | 70.3 | 3.3 |
| 5 | initial | 25° C. | 0.9 | -1.8 | 84.4 | 64.8 | 2 |
|  | 6,014 | 25° C. | -0.1 | -1.2 | 82.8 | 61.8 | 1.2 |
| 16 | initial | 25° C. | 0.2 | 5.3 | 80 | 56.6 | 5.3 |
|  | initial | 45° C. | 0.3 | 0.2 | 63 | 31.6 | 0.4 |
|  | initial | 65° C. | 2.9 | 3.1 | 32.6 | 7.3 | 4.3 |
|  | initial | 85° C. | 6.9 | 4 | 13.7 | 1.7 | 8 |
|  | 6,155 | 25° C. | 0.2 | 4.9 | 80 | 56.7 | 4.9 |

TABLE 2-continued

Color Coordinates Calculated from Measured Visible Spectra for Select Examples. Spectra were measured before and after Weatherometer (WOM) exposure with a xenon arc lamp intensity of 0.55 W/m² @ 340 nm and black panel temperature of 85° C.
For laminates from examples 2, 3 and 5, a UV barrier was placed between the laminate and the light source in the WOM. For laminates from examples 16, 17 and 20, the side of the laminate with the film from example 14 was oriented toward the light source.

| Laminate from Example | WOM Hours | Laminate Temperature at Spectra Acquisition | a* | b* | L* | Y | c* |
|---|---|---|---|---|---|---|---|
|  | 6,155 | 65° C. | -1.7 | -1.2 | 36.9 | 9.5 | 2.1 |
|  | 6,155 | 85° C. | 2.2 | 1.2 | 18.5 | 2.6 | 2.5 |
| 17 | initial | 25° C. | -3.1 | 3.5 | 83.7 | 63.4 | 4.6 |
|  | initial | 65° C. | 1.2 | 7.5 | 40.3 | 11.4 | 7.6 |
|  | initial | 85° C. | 6.9 | 8.4 | 19.7 | 2.9 | 10.8 |
|  | 4,145 | 25° C. | -3.7 | 6.2 | 85.9 | 67.7 | 7.3 |
|  | 4,145 | 65° C. | -1.3 | 6 | 44 | 13.9 | 6.1 |
|  | 4,145 | 85° C. | 4.2 | 7.7 | 24 | 4.1 | 8.8 |
| 20 | initial | 25° C. | 1 | 4.2 | 81.8 | 60 | 4.3 |
|  | initial | 45° C. | -2 | 3.7 | 59.9 | 28 | 4.2 |
|  | initial | 65° C. | 1 | 2.2 | 30.1 | 6.3 | 2.5 |
|  | initial | 85° C. | 5.9 | -0.9 | 10.6 | 1.2 | 6 |
|  | 6,014 | 25° C. | -0.8 | 6.1 | 79 | 55 | 6.2 |
|  | 6,014 | 65° C. | -3 | -6 | 34.4 | 8.2 | 6.7 |
|  | 6,014 | 85° C. | 0.6 | -4.9 | 15.9 | 2.1 | 4.9 |

TABLE 3

Color Coordinates Calculated from Measured Visible Spectra for Example 24.

| Laminate from Example | Laminate Temperature at Spectra Acquisition | a* | b* | L* | Y | c* |
|---|---|---|---|---|---|---|
| 24 | 20° C. | -8.4 | -1.8 | 77.4 | 52.1 | 8.6 |
|  | 35° C. | -8.1 | -3.1 | 71.2 | 42.4 | 8.7 |
|  | 45° C. | -7.5 | -3.5 | 62.4 | 30.8 | 8.3 |
|  | 55° C. | -5.9 | -2.4 | 50.7 | 19.1 | 6.4 |
|  | 65° C. | -3 | -0.6 | 37.5 | 9.8 | 3.1 |
|  | 75° C. | 0.6 | 0.8 | 25.3 | 4.5 | 1.0 |
|  | 85° C. | 3.6 | 1.2 | 15.7 | 2 | 3.8 |

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A thermochromic laminate comprising:
   1) a first LETC layer;
   2) a second LETC layer;
   3) a separator layer between the two LETC layers; and
   4) an additive within at least one layer of the laminate wherein the additive is a dye that has an absorbance maximum between about 500 nanometers and about 560 nanometers and provides an absorbance increase in the range of 0.05 to 0.4 absorbance units within the wavelength range of about 500 nanometers to about 560 nanometers.

2. The laminate of claim 1 wherein the dye is selected from Keyplast Red 2G, Quinaldine Red, Safranin O, Astrazon Orange G, Keyplast Red A, Keyplast Scarlet BLZ and combinations thereof.

3. The laminate of claim 1 wherein the dye comprises:
1) nickel ions;
2) bromide ions; and
3) one or more of neocuproine, 6,6'-dimethyl-2,2'-dipyridyl, 6-methyl-2,2'-dipyridylamine, 6,6'-dimethyl-2,2'-dipyridylamine and 6-butyl-6'-methyl-2,2'-dipyridyl.

4. The of claim 1 further comprising:
5) a spectrally selective lamination layer; and
6) a separator layer between the spectrally selective lamination layer and the first LETC layer.

5. The laminate of claim 4 wherein the dye is located within the spectrally selective lamination layer, the separator layer between the lamination layer and the first LETC layer, the first LETC layer, the second LETC layer, the separator layer between the two LETC layers or some combination thereof.

6. The laminate of claim 5 wherein the dye is selected from Keyplast Red 2G, Quinaldine Red, Safranin O, Astrazon Orange G, Keyplast Red A, Keyplast Scarlet BLZ and combinations thereof.

7. The laminate of claim 5 wherein the dye comprises:
1. nickel ions;
2. bromide ions; and
3. one or more of neocuproine, 6,6'-dimethyl-2,2'-dipyridyl, 6-methyl-2,2'-dipyridylamine, 6,6'-dimethyl-2,2'-dipyridylamine and 6-butyl-6'-methyl-2,2'-dipyridyl.

8. The laminate of claim 1 further comprising a sheet of glass.

9. A thermochromic laminate comprising a glass layer, a LETC layer and an additive that has an absorbance maximum between about 500 nanometers and about 560 nanometers, wherein the color coordinate values of the laminate are about $-8.5 \leq a^* \leq$ about 8.5 and about $-8.5 \leq b^* \leq$ about 8.5 throughout the temperature range of about 0° C. to about 85° C.

10. The laminate of claim 9 wherein the additive is selected from Keyplast Red 2G, Quinaldine Red, Safranin O, Astrazon Orange G, Keyplast Red A, Keyplast Scarlet BLZ and combinations thereof.

11. The laminate of claim 9 wherein the additive is selected from neocuproine, 6,6'-dimethyl-2,2'-dipyridyl, 6-methyl-2,2'-dipyridylamine, 6,6'-dimethyl-2,2'-dipyridylamine, 6-butyl-6'-methyl-2,2'-dipyridyl and combinations thereof.

* * * * *

UNITED STATES PATENT AND TRADEMARK OFFICE
CERTIFICATE OF CORRECTION

| | | |
|---|---|---|
| PATENT NO. | : 9,465,239 B2 | Page 1 of 1 |
| APPLICATION NO. | : 14/264254 | |
| DATED | : October 11, 2016 | |
| INVENTOR(S) | : Christopher D. Anderson et al. | |

It is certified that error appears in the above-identified patent and that said Letters Patent is hereby corrected as shown below:

In the Claims

In Claim 4, Column 13, Line 8 reads:

"4. The of claim 1 further comprising:"

It should read:

-- 4. The laminate of claim 1 further comprising: --

Signed and Sealed this
Twenty-seventh Day of December, 2016

Michelle K. Lee
*Director of the United States Patent and Trademark Office*